E. E. BARNEY.
TYPE WRITING MACHINE.
APPLICATION FILED JUNE 30, 1909.
967,706.
Patented Aug. 16, 1910.
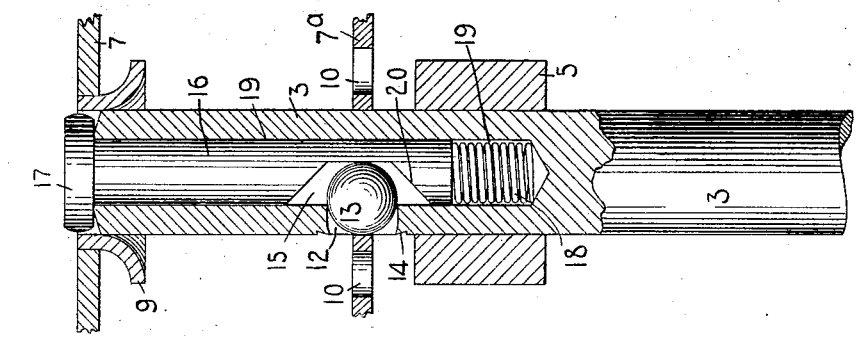
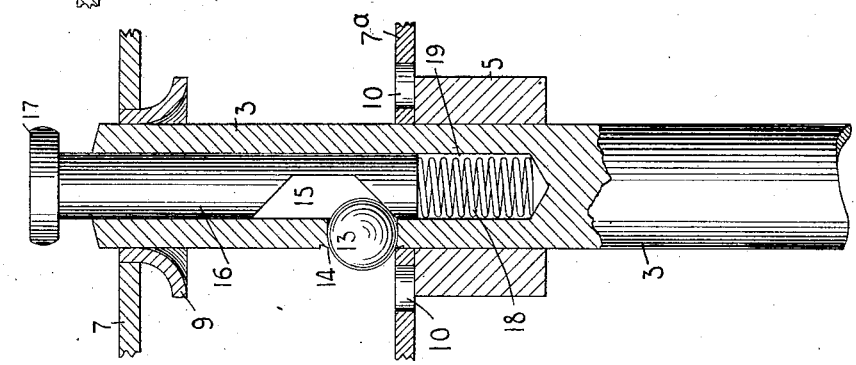
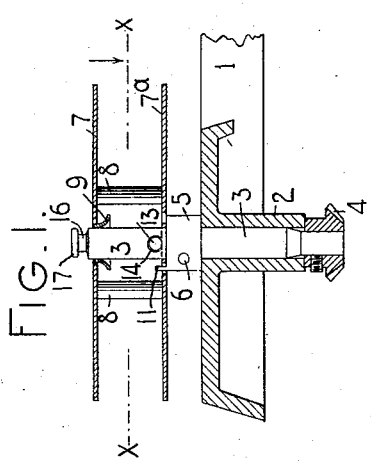
WITNESSES:
E. M. Wells.
Charles E. Smith.
INVENTOR:
Edwin E. Barney
By Jacob Felbel
HIS ATTORNEY

UNITED STATES PATENT OFFICE.

EDWIN E. BARNEY, OF SYRACUSE, NEW YORK, ASSIGNOR TO THE MONARCH TYPE-WRITER COMPANY, OF SYRACUSE, NEW YORK, A CORPORATION OF NEW YORK.

TYPE-WRITING MACHINE.

967,706.  Specification of Letters Patent. Patented Aug. 16, 1910.

Application filed June 30, 1909. Serial No. 505,168.

*To all whom it may concern:*

Be it known that I, EDWIN E. BARNEY, a citizen of the United States, and resident of Syracuse, in the county of Onondaga and State of New York, have invented certain new and useful Improvements in Type-Writing Machines, of which the following is a specification.

My invention relates to typewriting machines and has for its main object to provide simple and efficient means which can be manufactured at small cost for connecting a ribbon spool to its driving means and for readily detaching the spool therefrom when desired.

To the above and other ends which will hereinafter appear, my invention consists in the features of construction, arrangements of parts and combinations of devices to be hereinafter described and particularly pointed out in the appended claims.

In the accompanying drawings, Figure 1 is a fragmentary vertical sectional view taken through the top plate and showing a ribbon spool shaft, a ribbon spool and devices made in accordance with my invention for locking the spool to the shaft and readily detaching the same when desired. Fig. 2 is a transverse sectional view taken through the ribbon spool on the line $x$—$x$ of Fig. 1 and looking in the direction of the arrow at said line. Fig. 3 is an enlarged detail fragmentary vertical sectional view showing a portion of the ribbon spool and the means for detachably securing the same to its driving shaft, the parts being shown in the locked position. Fig. 4 is a like view of the same showing the locking means released and the spool partly removed from the shaft.

I have shown my invention in connection with a form of ribbon spool and driving mechanism such as are employed in the Monarch machine, though it should be understood that the invention may be embodied in various styles of typewriting machines.

The top plate 1 of the machine has a depending bearing lug or stud 2 through which a vertically disposed driving shaft 3 extends. The lower end of the shaft is provided with a bevel gear 4 connected to suitable driving means by which the shaft is rotated to wind the spool. A collar 5 is secured to the driving shaft by a screw or pin 6 and this collar bears on the top plate and supports the driving shaft in its bearing. The ribbon spool in the present instance comprises upper and lower flanges 7 and 7ª, respectively, united by three posts or spindles 8 riveted to and connecting the flanges and forming a core for the spool. A cone-like finder or directrix 9 is secured in the central opening in the flange 7 to guide the ribbon spool shaft to the central opening in the upper flange. The lower flange 7ª of the spool rests upon the collar 5 and is provided with a circular series of openings 10 into one of which projects an upwardly extending finger or pin 11 on the collar, to lock the ribbon spool to rotate with its driving shaft 3. The upper end portion of the driving shaft 3 is provided with a lateral or transverse opening 12 that leads into the space between the flanges of the spool and in which a locking device 13 is adapted to be received. The locking device 13 in the present instance is in the form of a ball and the lateral opening 12 is of sufficient dimensions to receive the ball and afford a movement thereof at right angles to the axis of the shaft but the out-let of the opening is contracted as indicated at 14 to prevent the ball from passing entirely through the opening 12. The upper end portion of the driving shaft is also provided with an axial opening 15 in which a plunger 16 fits and is adapted to work. The upper end of the plunger is provided with a finger piece or head 17 by which the plunger may be controlled. The lower end of the opening 15 contains a coiled expansion spring 18 which bears at its lower end against the lower wall of the axial opening 15 and at its upper end against the lower end of the plunger 16 to normally maintain the plunger elevated as shown in Fig. 3. The plunger is provided with a cut-out or opening 19, one wall 20 of which constitutes a cam face which is coöperative with the locking ball 13 as shown in Fig. 3 to force the ball out through the lateral opening 12 in the driving shaft to overlap the lower flange 7ª and prevent the removal of the spool from the shaft. The spring 18 normally maintains the plunger 16 in the position shown in Fig. 3 to hold the locking ball projected to lock the spool on the shaft. Should the operator desire to remove the spool from the shaft it is merely necessary to depress the plunger 16 through the finger piece 17, moving the cam 20 downwardly out of contact with the locking ball 13, the latter then being free to enter deeper into the recess 19 in the plunger. The ball may at this time drop back into the recess 19. At any rate the ball will be forced back into the recess when pressure is exerted upwardly on the ribbon spool. At such time the lower flange will bear against the ball and force it inwardly into the recess in the plunger as shown in Fig. 4. It will be seen that the dimensions of the recess 19 in the plunger are such that the locking ball 13 may be forced back of the periphery of the shaft so as to offer no obstruction to the removal of the ribbon spool, the lower flange of the spool then being adapted to pass the locking ball as shown in Fig. 4.

In assembling the parts the lateral aperture 12 is drilled through the shaft, the opening being slightly larger than the diameter of the locking ball. The bur 14 is afterward formed to slightly contact the out-let of the opening, thus limiting the outward movement of the ball to the position shown in Fig. 3 so as to prevent the removal of the ball through the opening 12. It will be understood that the insertion of the locking ball through the opening 12 in the first instance likewise moves the ball into the recess 19 in the plunger 16 and prevents the removal of the plunger from its axial bore in the shaft.

It will be seen from the foregoing description that I have provided simple and efficient means adapted to form an interlocking connection with the spool for connecting the spool to the shaft and for readily affording a removal of the spool from the shaft when desired. It will also be seen that the means for locking the spool on its shaft and for affording a detachment of the spool may be said to comprise three parts, i. e., the locking ball 13, the plunger 16 and the spring 18, and that these devices are simple in construction, are cheap to manufacture and cannot be easily destroyed or disarranged. Moreover, the position of the finger piece 17 of the plunger 16 affords ready access to the releasing means, presented as it is on top of the ribbon spool where it may be readily actuated.

Various modifications may be made without departing from the spirit of my invention.

What I claim as new and desire to secure by Letters Patent, is:—

1. In a typewriting machine, the combination of a driving shaft having an axial opening therein; a member surrounding the shaft and detachable therefrom; and means for detachably connecting said member to said shaft, said means comprising a locking ball extending into said axial opening and adapted to form an interlocking connection between said shaft and member to prevent a detachment of the member, and means operable at will for affording a movement of the ball in said opening to carry the ball out of coöperative relation with said member, thus breaking said interlocking connection and affording a removal of said member.

2. The combination of a driving shaft with an axial opening therein; a spool; and means for connecting said spool to said shaft, said means comprising a locking ball received in said axial opening, and means received in said opening for moving said locking ball into and out of locking position.

3. In a typewriting machine, the combination of a ribbon spool shaft having an axial opening therein; a ribbon spool; and means for detachably connecting said ribbon spool to said shaft, said means comprising a locking device received in said axial opening and adapted to be projected into the path of the spool to prevent a withdrawal of the spool from said shaft, and a spring-pressed plunger for holding said device in its locking position.

4. In a typewriting machine, the combination of a ribbon spool shaft; a ribbon spool; and means for detachably connecting said ribbon spool to said shaft, said means comprising a locking device adapted to be projected into the path of the spool to prevent a withdrawal of the spool from said shaft, a spring-pressed plunger movable axially of said shaft for holding said device in its locking position, and a finger piece connected to said plunger for releasing said device to afford a withdrawal of the spool from said shaft.

5. In a typewriting machine, the combination of a ribbon spool shaft; a ribbon spool which surrounds said shaft; and means for detachably connecting said spool to said shaft, said means comprising a locking ball contained in an opening in said shaft and adapted to overlap the spool and prevent a withdrawal of the spool from the shaft, and means for affording a movement of the ball to a position where the spool is free to be withdrawn from the shaft.

6. In a typewriting machine, the combination of a ribbon spool shaft; a ribbon spool surrounding said shaft; and means for detachably connecting said spool to said shaft, said means comprising a locking ball contained in an opening in said shaft and adapted to overlap the spool and prevent a withdrawal of the spool from the shaft, and spring-pressed means coöperative with said ball for normally retaining the ball in locking position and for affording a movement of the ball to a position where the spool is free to be withdrawn from the shaft.

7. In a typewriting machine, the combination of a ribbon spool shaft; a ribbon spool surrounding said shaft; and means for detachably connecting said spool to said shaft, said means comprising a locking ball contained in an opening in said shaft and adapted to project outwardly beyond the periphery of the shaft and to overlap the spool and prevent a withdrawal of the spool from the shaft, and means for affording a movement of the ball inwardly at right angles to the axis of the shaft and to a position where the spool is free to be withdrawn from the shaft.

8. In a typewriting machine, the combination of a ribbon spool shaft; a ribbon spool; and means for detachably connecting said spool to said shaft, said means comprising a locking ball contained in an opening in said shaft and adapted to overlap the spool and prevent a withdrawal of the spool from the shaft, and a hand controlled spring-pressed plunger coöperative with said ball for normally retaining the ball in locking position and for affording a movement of the ball to a position where the spool is free to be withdrawn from the shaft.

9. In a typewriting machine, the combination of a ribbon spool shaft; a ribbon spool; and means for detachably connecting said spool to said shaft, said means comprising a locking device contained in a lateral opening in said shaft and adapted to overlap the ribbon spool and prevent a withdrawal of the spool from the shaft, and a hand controlled plunger contained in an opening extending axially of said shaft and coöperative with said device to press it out through said lateral opening in the shaft and beyond the periphery of the shaft to locking position and adapted to afford a movement of said device to a position within the periphery of the shaft to release the spool and permit its removal from the shaft.

10. In a typewriting machine, the combination of a ribbon spool shaft; a ribbon spool; and means for detachably connecting said spool to said shaft, said means comprising a locking device contained in a lateral opening in said shaft and adapted to overlap the ribbon spool and prevent a withdrawal of the spool from the shaft and a spring-pressed hand controlled plunger contained in an opening extending axially of said shaft, a cam on said plunger coöperative with said device to normally press it out through said lateral opening in the shaft and beyond the periphery of the shaft to locking position and adapted to afford a movement of said device to a position within the periphery of the shaft to release the spool and permit its removal from the shaft.

11. In a typewriting machine, the combination of a ribbon spool shaft; a ribbon spool; and means for detachably connecting said spool to said shaft, said means comprising a locking ball contained in a lateral opening in said shaft, said opening having a contracted out-let to prevent the locking ball from passing therethrough, said locking ball being adapted to overlap the ribbon spool and prevent a withdrawal of the spool from the shaft, and hand controlled means for regulating the position of the locking ball in said opening, to lock the spool on or afford a removal of the spool from the shaft.

12. In a typewriting machine, the combination of a ribbon spool shaft; a ribbon spool; and means for detachably connecting said spool to said shaft, said means comprising a locking ball contained in a lateral opening in said shaft, said opening having a contracted out-let to prevent the locking ball from passing therethrough, said locking ball being adapted to overlap the ribbon spool and prevent a withdrawal of the spool from the shaft, a spring-pressed hand-controlled plunger contained in an opening extending axially of said shaft, and a cam on said plunger coöperative with said locking ball to normally press it out through said lateral opening in the shaft and beyond the periphery of the shaft to locking position and adapted to afford a movement of said locking ball to a position within the periphery of the shaft to release the spool and permit its removal from the shaft.

13. In a typewriting machine, the combination of a ribbon spool shaft; a ribbon spool; and means for detachably connecting said spool to said shaft, said means comprising a locking device contained in a transverse opening in said shaft and adapted to overlap a flange of the spool and prevent a withdrawal of the spool from the shaft, and a hand-controlled plunger provided with a recess in which said locking device is adapted to be received, said plunger coöperating with said locking device to normally press it through said transverse opening to locking position and adapted to afford a movement of the locking device into the said recess in the plunger to release the spool and permit its removal from the shaft.

14. In a typewriting machine, the combination of a ribbon spool shaft; a ribbon spool; and means for detachably connecting said spool to said shaft, said means comprising a locking ball contained in a transverse opening in said shaft and adapted to overlap a flange of the spool and prevent a withdrawal of the spool from the shaft, and a hand-controlled spring-pressed plunger provided with a recess in which said locking ball is adapted to be received, said plunger working in an axially extending opening in said shaft and provided with a cam which coöperates with said locking ball to normally press it through said transverse opening in the shaft to locking position and adapted to afford a movement of the locking ball into the said recess in the plunger and away from the spool flange to release the spool and permit its removal from the shaft.

Signed at Syracuse, in the county of Onondaga and State of New York this 28th day of June, A. D. 1909.

EDWIN E. BARNEY.

Witnesses:
ISAAC L. BERRY,
WESLEY ONDERDONK.